UNITED STATES PATENT OFFICE.

DANIEL W. BROWN, OF COLESBURG, TENNESSEE.

TANNING COMPOUND.

1,036,958. Specification of Letters Patent. Patented Aug. 27, 1912.

No Drawing. Application filed January 23, 1912. Serial No. 672,880.

*To all whom it may concern:*

Be it known that I, DANIEL W. BROWN, citizen of the United States, residing at Colesburg, in the county of Dickson and State of Tennessee, have invented a new and useful Tanning Compound, of which the following is a specification.

This invention has reference to a compound of matter for use in connection with the tanning of hides, its object being to provide a compound wherein the ingredients are inexpensive, and whereby the tanned leather is firm, flexible and waterproof.

The ingredients employed comprise fluid extract of decoction of yellow dock, fluid extract of bugle weed, (*Lycopus Virginicus*), extract of catechu, fluid extract of hemlock bark and gambier. While it is not mandatory that any exact formula as to the quantities of these several ingredients be followed, practice has demonstrated that excellent results are obtained by the following proportions of the ingredients used in the manner stated. For calf, wolf, sheep, goat, deer and hides similar in size and weight, there are employed three gallons of strong decoction of yellow dock roots, or three gallons of water to which has been added one pound of fluid extract of yellow dock, then add one ounce of fluid extract of bugle weed, one ounce of the extract of catechu, and one ounce of fluid extract of hemlock bark. The hide is immersed in such fluid and allowed to remain therein for twenty-four hours to color and set the grain. The hides are now removed and to the fluid is added one pound of gum gambier dissolved, preferably in a new tin, brass or copper vessel, and then cooled and strained. The hide or hides are then replaced in the compound and allowed to remain until tanned, this last process taking from twelve to twenty-four hours in addition to the first immersion. For larger and heavier hides, such as yearling and two year hides, there are employed five gallons of a strong decoction of yellow dock roots, or one and one-quarter pounds of fluid extract of yellow dock in five gallons of water, and to this is added two ounces each of fluid extract of bugle weed, extract of catechu and fluid extract of hemlock bark. The hide or hides remain in this solution for twenty-four hours to color and set the grain, after which the hide is removed and from one to two pounds of gambier are added when the hide is replaced and allowed to set until tanned, which will take from three to five days in addition to the first immersion. For horse, cow, ox, bear and all other large hides from five to seven gallons of a strong decoction of yellow dock roots is employed, or five to seven gallons of water and one and one-half to two pounds of fluid extract of yellow dock. To this is added four ounces each of fluid extract of bugle weed, extract of catechu, and fluid extract of hemlock bark. The hide is placed in this compound and allowed to remain for twenty-four hours to color and set the grain. Then the hide is removed and from three to five pounds of gambier are added to the compound, after which the hide is replaced and allowed to remain until tanned, which takes from five to fifteen days additional.

The process of tanning may be stated as follows: The hides are soaked until perfectly soft and the fat and loose flesh are removed. They are then immersed in a very thin batter of slaked lime and water in which they are allowed to remain from four to twenty-four hours, or until the hair slips, the hides being taken out of the lime and replaced therein several times for the purpose of airing and finally they are taken from the lime and the hair removed. The hides are washed either in running water or several changes of clear water to eliminate the lime and are then placed in the tanning compound or ooze as hereinbefore described. After the hides have been tanned they are removed from the compound, thoroughly washed, and then hung in the shade until partially dried, after which the grain side is oiled and slicked in the usual way.

The extracts of bugle weed and of hemlock bark thoroughly remove the glue and obviate the use of acids commonly employed. Catechu is an active tanning agent, and is of particular use in the coloring. The yellow dock is of importance in coloring and setting the grain, since it will not cause wrinkling of the grain such as occurs when the hide is first placed in an ooze prepared from gambier for coloring and setting the grain.

What is claimed is:—

1. A tanning compound comprising extracts of yellow dock, bugle weed, catechu, and hemlock bark.
2. A tanning compound comprising extracts of yellow dock, bugle weed, catechu, hemlock bark, and gambier.

In testimony, that I claim the foregoing as my own, I have hereto affixed my signature in the presence of two witnesses.

DANIEL W. $\underset{\text{mark}}{\overset{\text{his}}{\times}}$ BROWN.

Witnesses:
AARON BROWN,
LULA McELYEA.